US005575348A

United States Patent [19]
Goertzen et al.

[11] Patent Number: 5,575,348

[45] Date of Patent: Nov. 19, 1996

[54] POWERED WHEELCHAIR WITH ADJUSTABLE CENTER OF GRAVITY AND INDEPENDENT SUSPENSION

[75] Inventors: Gerold G. Goertzen, Brunswick; Neal J. Curran, Lakewood; James H. Molnar, Bedford, all of Ohio

[73] Assignee: Invacare Corporation, Elyria, Ohio

[21] Appl. No.: 228,584

[22] Filed: Apr. 15, 1994

[51] Int. Cl.⁶ .......... B60K 1/02

[52] U.S. Cl. .......... 180/65.6; 180/907; 297/DIG. 4

[58] Field of Search .......... 180/907, 65.6; 280/250.1, 304.1, 690, 701, 708; 297/DIG. 4, 316, 325, 327, 328, 344.15, 354.12, 363, 364

[56] References Cited

U.S. PATENT DOCUMENTS

| | | | |
|---|---|---|---|
| 1,973,627 | 9/1934 | Harter | 297/363 |
| 3,881,773 | 5/1975 | Rodaway | 280/250.1 |
| 3,893,529 | 7/1975 | Karchak, Jr. et al. . | |
| 3,901,337 | 8/1975 | Cragg | 180/907 |
| 3,917,312 | 11/1975 | Rodaway . | |
| 4,078,817 | 3/1978 | Ferguson et al. | 280/250.1 |
| 4,310,167 | 1/1982 | McLaurin | 280/250.1 |
| 4,405,142 | 9/1983 | Whetstine . | |
| 4,436,320 | 3/1984 | Brudermann et al. . | |
| 4,455,031 | 6/1984 | Hosaka . | |
| 4,500,102 | 2/1985 | Haury et al. | 297/DIG. 4 |
| 4,641,848 | 2/1987 | Ayers | 280/250.1 |
| 4,730,842 | 3/1988 | Summers et al. . | |
| 4,805,925 | 2/1989 | Haury et al. . | |
| 4,861,056 | 8/1989 | Duffy, Jr. et al. | 280/250.1 |
| 4,967,864 | 11/1990 | Boyer et al. . | |
| 4,989,890 | 2/1991 | Lockard et al. . | |
| 5,020,816 | 6/1991 | Mulholland . | |
| 5,044,647 | 9/1991 | Patterson | 180/907 |
| 5,076,602 | 12/1991 | Robertson et al. | 297/338 |
| 5,113,959 | 5/1992 | Mastov et al. | 180/65.6 |
| 5,125,468 | 6/1992 | Coker . | |
| 5,156,226 | 10/1992 | Boyer et al. . | |
| 5,176,393 | 1/1993 | Robertson et al. . | |
| 5,180,025 | 1/1993 | Yeh et al. | 180/907 |
| 5,197,559 | 3/1993 | Garin, III et al. . | |
| 5,294,141 | 3/1994 | Mentessi et al. | 297/328 |
| 5,297,021 | 3/1994 | Koerlin et al. | 180/907 |
| 5,351,774 | 10/1994 | Okamoto | 180/907 |
| 5,366,037 | 11/1994 | Richey | 180/65.6 |

FOREIGN PATENT DOCUMENTS

| | | | |
|---|---|---|---|
| 0339500A2 | 4/1989 | European Pat. Off. . | |
| 0511113A2 | 10/1992 | European Pat. Off. . | |
| 0268960 | 6/1988 | Germany | 280/304.1 |
| 0339500 | 11/1989 | Germany | 180/907 |
| 2040237B | 8/1980 | United Kingdom . | |
| 2061197 | 5/1981 | United Kingdom . | |
| 2141980 | 2/1985 | United Kingdom . | |
| 9005515 | 5/1990 | WIPO | 180/907 |
| W093/24342 | 12/1993 | WIPO . | |

*Primary Examiner*—Brian L. Johnson
*Assistant Examiner*—Min Yu
*Attorney, Agent, or Firm*—Fay, Sharpe, Beall, Fagan, Minnich & McKee

[57] ABSTRACT

A wheelchair includes a frame having first and second longitudinal sides connected by a bridge and a seat module carried by the frame. A first power drive assembly is disposed on the frame first longitudinal side. The first power drive assembly includes a first swing arm pivotally secured to the frame, a first motor mounted to the first swing arm and a first wheel operably connected to the first motor. A second power drive assembly is disposed on the frame second longitudinal side. The second power drive assembly includes a second swing arm pivotally secured to the frame, a second motor mounted to the second swing arm and a second wheel operably connected to the second motor. A first resiliently biased anti-tip assembly is secured to both the frame first longitudinal side and the first motor. A second resiliently biased anti-tip assembly is secured to both the frame second longitudinal side and the second motor. A power supply is mounted on the frame for powering the first and second motors.

22 Claims, 8 Drawing Sheets

POWERED WHEELCHAIR WITH ADJUSTABLE CENTER OF GRAVITY AND INDEPENDENT SUSPENSION

BACKGROUND OF THE INVENTION

This invention relates to powered wheelchairs. More particularly, the present invention concerns a powered wheelchair having an independent suspension and an adjustable center of gravity.

Power drive wheelchairs in general are known in the art to provide motorized mobility to persons confined to a wheelchair. Such power drive wheelchairs conventionally comprise a relatively sturdy wheelchair frame supported on wheels for rolling movement, in combination with one or more batteries for supplying electrical power to one or more electrical motors coupled to the drive wheels of the wheelchair. An electronic control unit is also carried by the wheelchair to regulate power driven operation of the drive motor or motors. This is typically done in accordance with the positioning of a joystick-type control mechanism. Such joystick controls are usually located in close proximity to an armrest of the wheelchair. In many modern power drive wheelchairs, the control unit utilizes pulse width modulation techniques to regulate a pair of separate drive motors in a manner permitting sample joystick selection of wheelchair drive direction and speed. The wheelchair frame further carries a seat module including a seat and a backrest as well as armrests.

One of the problems associated with powered wheelchairs is that they have a tendency to tip backwards upon initial acceleration. The torque generated by the motor is often substantial and the unwary user may tip the wheelchair over. In light of this problem, many wheelchair manufacturers now provide anti-tip caster wheels positioned rearward of the drive wheels and mounted at a level just above the ground. As the wheelchair begins to tip backward, the anti-tip caster wheels engage the ground to prevent further tipping. However, such caster wheels are usually mounted on arms that are rigidly coupled to the support frame.

While such anti-tip mechanisms successfully prevent rearward tipping of the wheelchair in most instances, the rigid coupling of the anti-tip wheel to the support frame provides a fairly sudden jolt to the wheelchair's occupant as the anti-tip wheels engage the ground. Contact of the anti-tip wheel with the ground shifts the momentum of the wheelchair's occupant from a rearward direction to a forward direction thereby jolting the occupant. Such jolting is obviously undesirable for the occupant of the chair. Jolts are also encountered by the chair's occupant as the motorized chair moves over uneven floor or ground surfaces, such as cracks in concrete, curbs, or even simply a movement from a carpeted area to a bare floor area.

Another problem with conventional powered wheelchairs is that the vibrations of the motor are not isolated from the occupant of the wheelchair. As with jolts, motor vibrations also disturb the occupant of the wheelchair.

A further problem with powered wheelchairs has been the lack of adjustability of the seat module section of the chair. While adjustable seats and seatbacks are offered in manually powered chairs, this option has not been available in power drive wheelchairs despite the fact that such an option would be particularly advantageous to users of same.

Still a further problem with conventional powered wheelchairs has been that such wheelchairs are not provided with adjustable centers of gravity. This feature would be advantageous in order to allow the chair to be customized for the needs of the particular type of user employing the chair. For example, if the rear or power drive wheels of the chair could be brought more directly underneath the seat, thereby reducing the amount of downward force exerted on the front casters of the wheelchair, this would improve the maneuverability of the wheelchair making it easier to use in confined spaces. Alternatively, if the power drive wheels of the chair can be spaced further away from the seat, this would enlarge the wheel base of the chair, thereby making it more stable and less likely to tip.

Accordingly, it has been considered desirable to develop a new and improved powered wheelchair which would overcome the foregoing difficulties and others while providing better and more advantageous overall results.

BRIEF SUMMARY OF THE INVENTION

According to the present invention, a powered wheelchair is provided.

More particularly in accordance with the invention, the wheelchair comprises a frame having first and second longitudinal sides connected by a bridge and a seat module carried by the wheelchair frame. A first power drive assembly is disposed on the wheelchair frame first longitudinal side. The first power drive assembly comprises a first swing arm pivotally secured to the frame, a first motor mounted to the first swing arm and a first wheel operably connected to the first motor. A second power drive assembly is disposed on the wheelchair frame second-longitudinal side. The second power drive assembly comprises a second swing arm pivotally secured to the frame, a second motor mounted to the second swing arm and a second wheel operably connected to the second motor. A first resiliently biased anti-tip assembly is secured to both the frame first longitudinal side and the first motor. A second resiliently biased anti-tip assembly is secured to both the frame second longitudinal side and the second motor. A power supply is mounted on the frame for powering the first and second motors.

Preferably, the first and second motors comprise electric motors and the power supply comprises at least one battery. The frame bridge preferably comprises a pair of spaced supports to which a first end of a respective one of the first and second swing arms are secured. Fasteners are preferably provided for securing the first motor to a second end of the first swing arm and the second motor to a second end of the second swing arm. A plurality of apertures are preferably provided in each of the first and second swing arm second ends. The apertures are longitudinally spaced from each other to allow for a plurality of positions at which the first and second motors can be secured to the first and second swing arm second ends in order to adjust a center of gravity of the wheelchair.

The seat module comprises a seat frame secured to the frame of the wheelchair, a seat section, which is substantially horizontally oriented, secured to the seat frame and a seatback section, which is substantially vertically oriented, secured to the seat frame. The wheelchair can further comprise a first means for adjusting the seat section in relation to a horizontal plane, the means for adjusting extending between the seat frame and the frame of the wheelchair. The wheelchair can also comprise a second means for adjusting the seatback section in relation to a vertical plane, the second means for adjusting comprising cooperating portions of the seatback and the seat frame. The first and second power drive assemblies preferably each further comprise a gearbox secured to the respective motor and a wedge-shaped insert secured to the gearbox. The first and second swing arms are secured to their respective gearboxes over the respective wedge-shaped inserts. The wedge-shaped inserts allow an adjustment of the center of gravity of the wheelchair without a change in the height of the seat module of the wheelchair.

One advantage of the present invention is the provision of a new and improved motor driven wheelchair.

Another advantage of the present invention is the provision of a powered wheelchair with an adjustable center of gravity. This allows the wheelchair to be customized to the desires of its occupant.

Still another advantage of the present invention is the provision of a powered wheelchair in which the power drive assemblies propelling the rear wheels of the chair are resiliently mounted in relation to the seat module. Such mounting reduces the amplitude of vibrations and jolts that are transmitted to the person sitting in the wheelchair. The vibrations can originate from the motors driving the rear wheels as well as jolts and shocks experienced by the rear wheels, as the chair moves over uneven surfaces.

Yet another advantage of the present invention is the provision of a wheelchair with resiliently biased anti-tip wheels in order to reduce the jolts experienced by the occupant of the wheelchair when the wheelchair tips back onto its anti-tip wheels.

A further advantage of the present invention is the provision of a powered wheelchair with an adjustable seat module. This allows the seat module to be customized to the needs and desires of the occupant of the wheelchair.

A still further advantage of the present invention is the provision of a powered wheelchair employing a pair of motors, one for each of the power driven wheels of the wheelchair. The motors are each adjustably and removably mounted on swing arms secured to a frame of the wheelchair.

Still other benefits and advantages of the invention will become apparent to those skilled in the art upon a reading and understanding of the following detailed specification.

BRIEF DESCRIPTION OF THE DRAWINGS

The invention may take form in a certain construction, a preferred embodiment of which will be described in detail in this specification and illustrated in the accompanying drawings, wherein.

DETAILED DESCRIPTION OF THE PREFERRED EMBODIMENT

Figure 3:
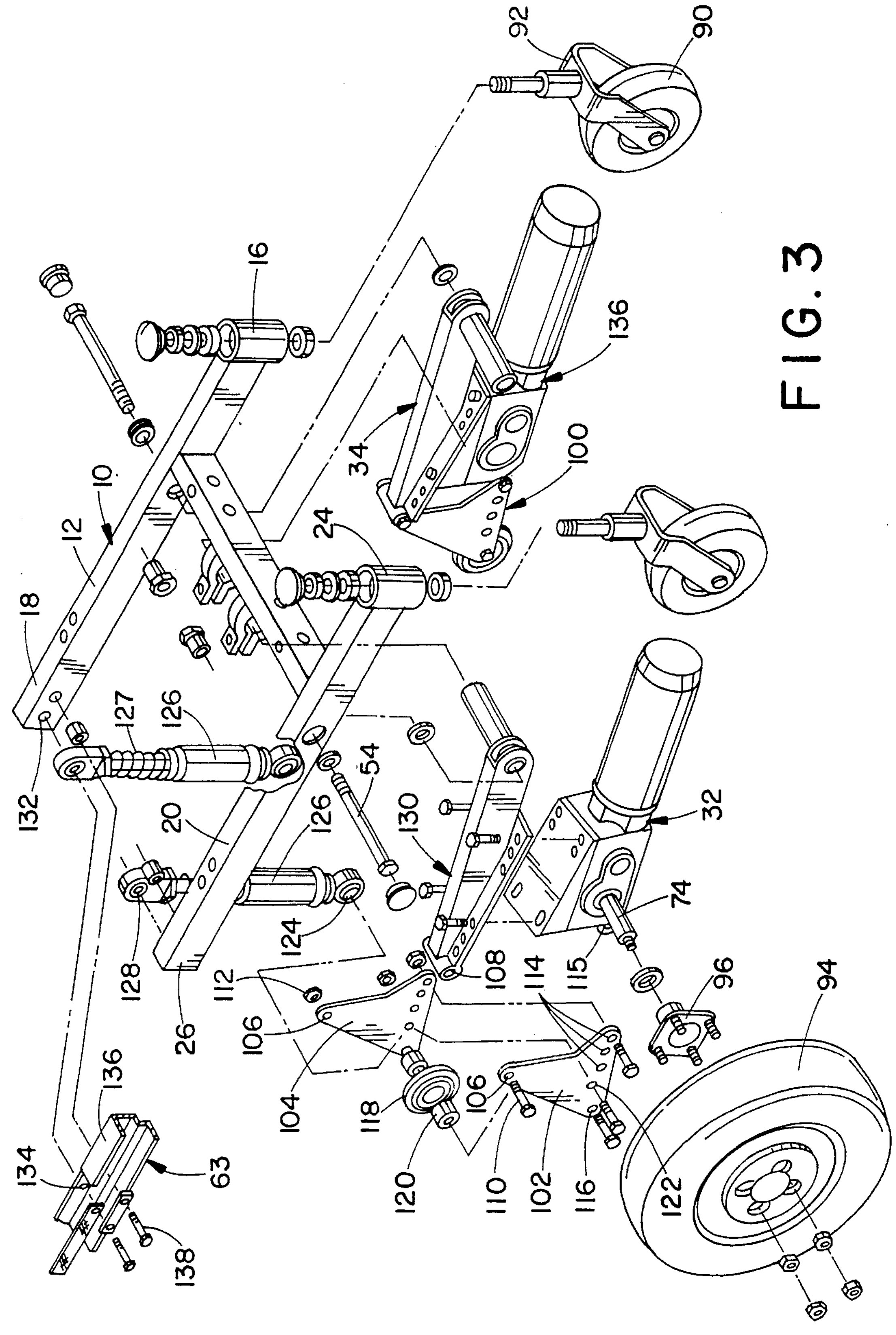
FIG. 3 is a reduced exploded perspective view of the frame, power drive assemblies and associated components of the wheelchair of FIG. 1.
Figures 6A, 6B:
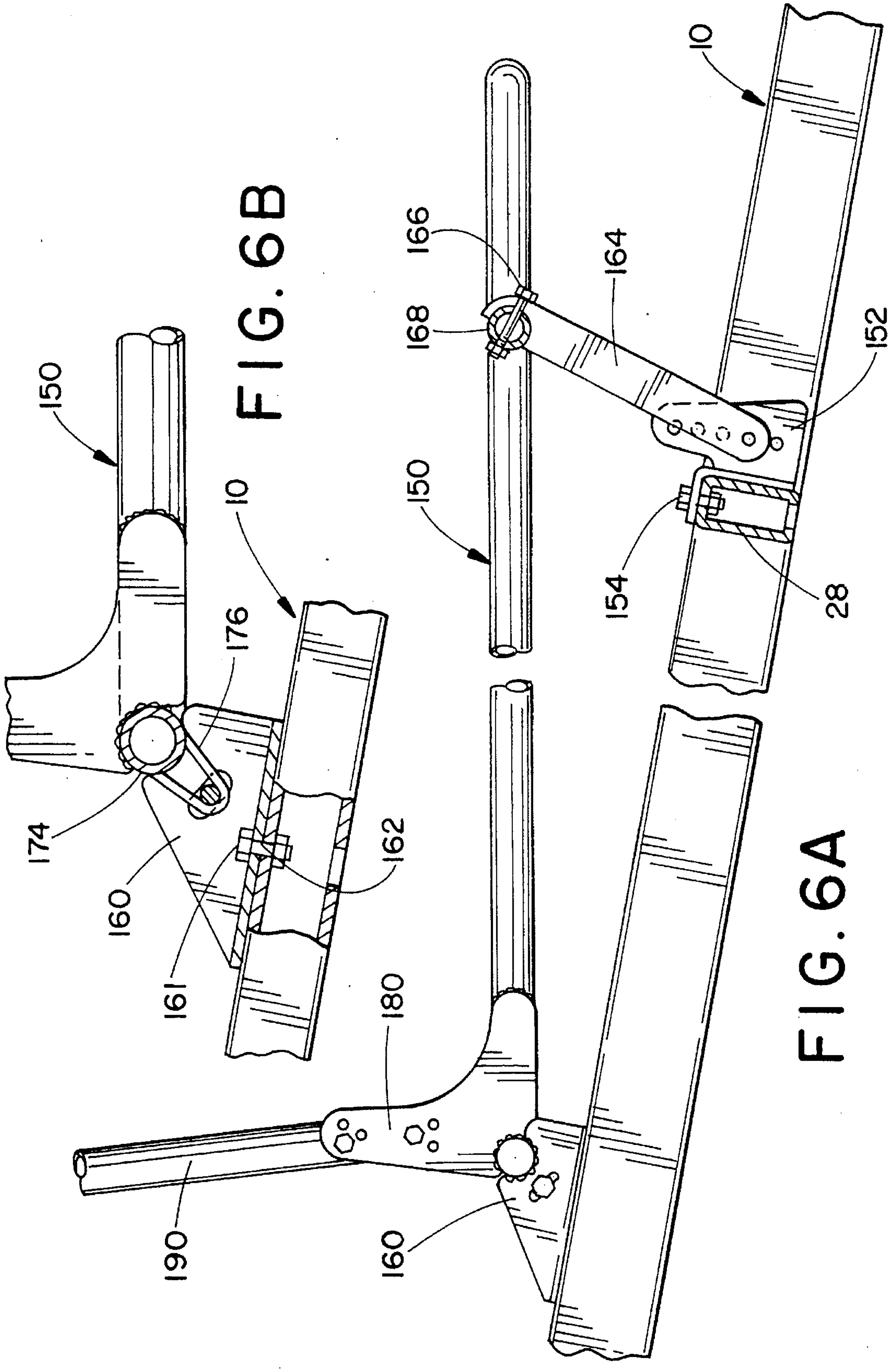
FIG. 6A is an enlarged side elevational view of a portion of the main frame of the wheelchair of FIG. 1 to which the seat frame of FIG. 4 is secured.
FIG. 6B is an enlarged partially cross-sectional view of a portion of the main frame and seat frame of FIG. 6A.
Figure 8:
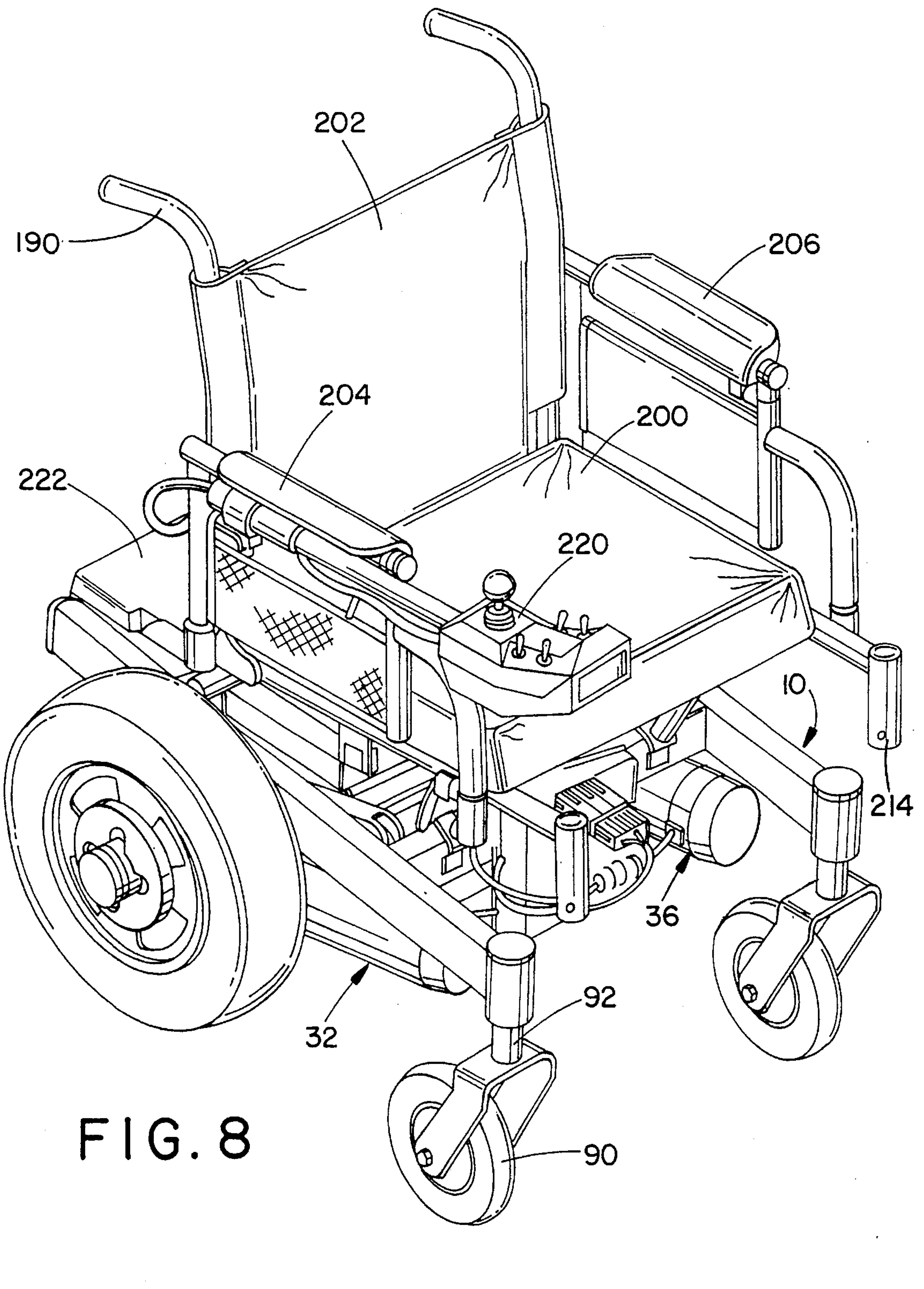

Referring now to the drawings wherein the showings are for purposes of illustrating a preferred embodiment of the invention only and not for purposes of limiting same, FIG. 8 is a perspective view of a wheelchair according to the present invention. FIG. 3, which is an exploded perspective view of certain portions of the wheelchair of FIG. 8, illustrates the wheelchair's adjustable center of gravity and its independent suspension. FIG. 6A illustrates the adjustable seat module of the wheelchair. While the invention is herein illustrated in connection with a powered wheelchair, it should be appreciated that certain of the features disclosed herein can also be used in manually propelled wheelchairs.

Figure 1:
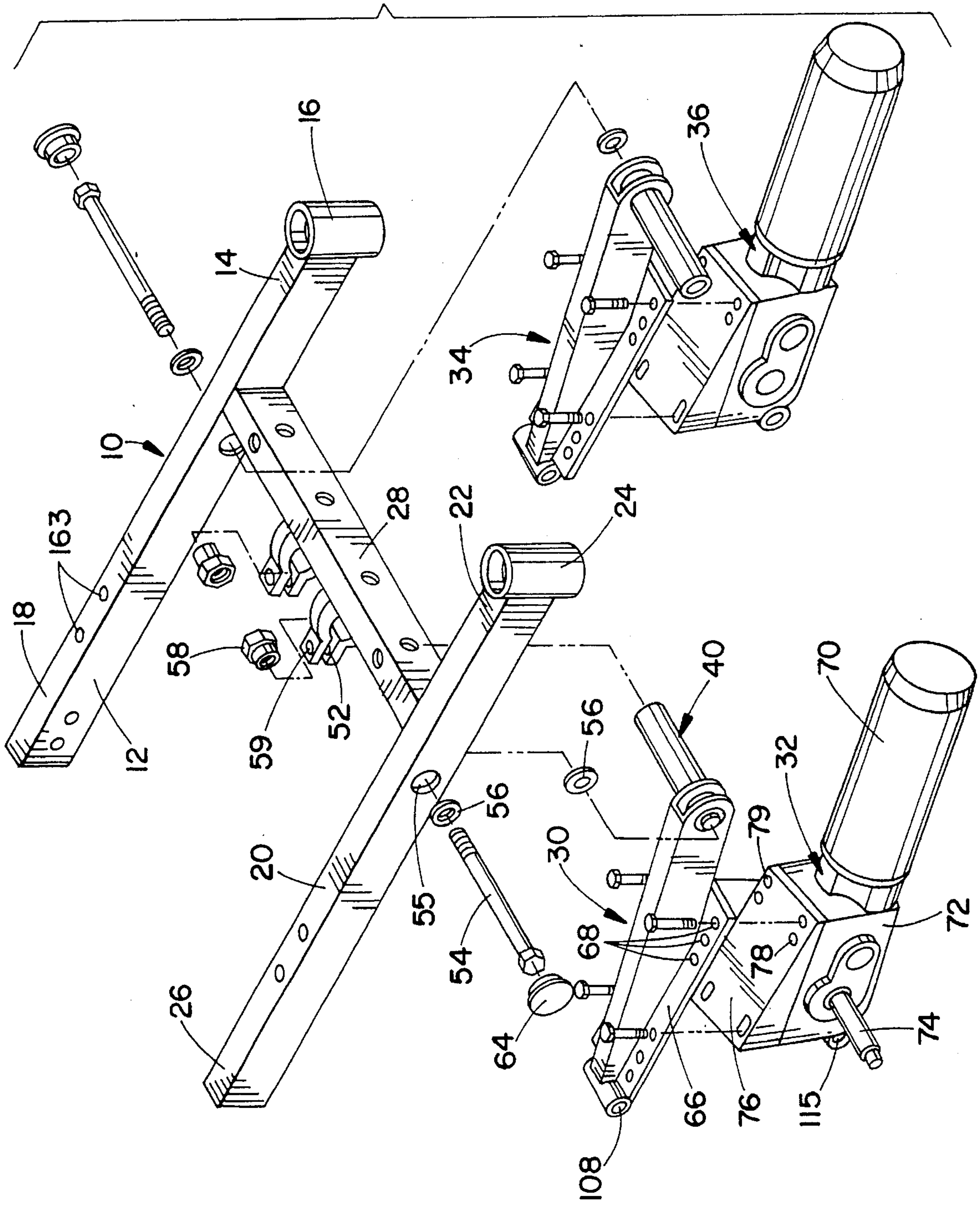
FIG. 1 is an exploded perspective view of a main support frame and a pair of power drive assemblies for a wheelchair according to the present invention.

With reference now to FIG. 1, the wheelchair comprises an H-shaped wheelchair main support frame 10 having a first longitudinal side 12 with a front end 14, on which is provided a vertically extending socket 16, and a rear end 18. The frame also includes a second longitudinal side 20 having a front end 22, on which is provided a vertically extending socket 24, and a rear end 26. Connecting the first and second sides 12 and 20 is a bridge 28. The frame is preferably a hollow rectangular tube made of a conventional metal. The frame is of sufficient rigidity and thickness as to support a seat module, an occupant, as well as power drive assemblies and batteries. More specifically, secured to the frame 10 are first and second power drive assemblies. The first power drive assembly comprises a first swing arm 30 and a first motor and gearbox assembly 32. The second power drive assembly comprises a second swing arm 34 and a second motor and gearbox assembly 36. Since the two power drive assemblies are mirror images of each other, only the left power drive assembly illustrated in FIG. 1 will be discussed in detail in this specification, it being appreciated that the right power drive assembly is the mirror image of the left one.

Figure 2:
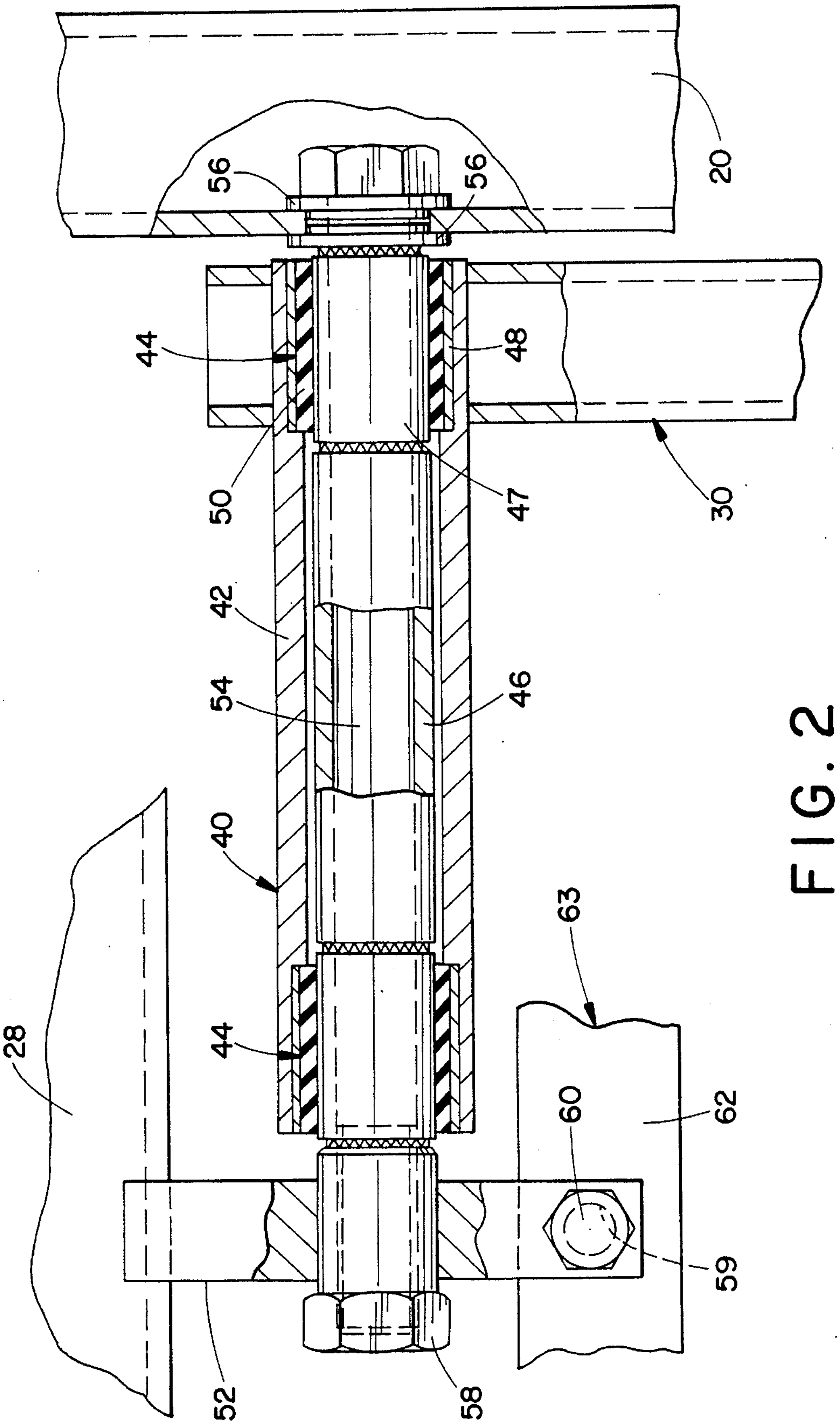
FIG. 2 is an enlarged cross-sectional view through a first end of a swing arm of one of the power drive assemblies of FIG. 1 when it is rotatably secured to the main support frame.

The first swing arm 30 has on a first end thereof a cylindrical suspension arm 40. With reference now to FIG. 2, the suspension arm 40 comprises a cylindrical outer sleeve 42. Located therein are a pair of silent block rubber bushings 44 which are separated by a spacer 46. Each of the silent block rubber bushings comprises an inner cylindrical sleeve 47 and an outer cylindrical sleeve 48, conventionally made of metal, which are separated by a sleeve 50 made of a suitable resilient material, such as rubber. The two resilient material sleeves 50 damp vibrations of the power drive assembly transmitted by the outer sleeve 42 and reduce the amplitude thereof before such vibrations are transmitted to the main support frame 10. It is noted that the spacer 46 has a smaller external diameter than the internal diameter of the outer sleeve 42 to prevent the transmission of vibration between them.

Provided on a rearwardly facing surface of the bridge 30 is a support 52 which can, if desired, comprise a pair of arms that define between them a slot as shown in FIG. 1. The support frame 10 is a hollow box frame, thus the two second sides 12 and 20 are hollow. A bolt 54 is inserted into the second side frame 20 through an aperture 55 (see FIG. 1) such that a head of the bolt 54 is located adjacent an inner side wall of the second side and a shaft of the bolt faces towards the center of the frame. The head of the bolt is seated on a first tapered washer 56. A second tapered washer 56 is located between the frame second side 20 and the adjacent silent block rubber bushing The shaft of the bolt extends through the cylindrical suspension arm 40 and terminates on the far side of the support 52. There, it is secured to a shoulder nut 58 positioned between the arms of the support 52. In this way, the swing arm is fastened in a pivotal manner to the frame 10.

As shown in FIG. 2, a pair of apertures 59 extend transversely through the two arms of the support 52 adjacent the free ends thereof. A fastener 60 can be secured through these apertures in order to hold a front rail 62 of a battery support subframe 63 to the support 52 and hence to the frame 10. With reference again to FIG. 1, a cap 64 is inserted into the aperture 55 in order to hide the head of the screw 54 and close the aperture 55 in the second side 20. As mentioned, the mirror image construction is provided on the right side of the wheelchair, i.e. for the second power drive assembly.

The first swing arm 30 is also provided with a plate-like second end 66. Extending transversely through the second end are a plurality of spaced apertures 68. These are located in two sets of three along each side edge of the second end 68 (only the two sets of apertures along one side edge of the plate-like end 66 being visible in FIG. 1).

Figure 7:
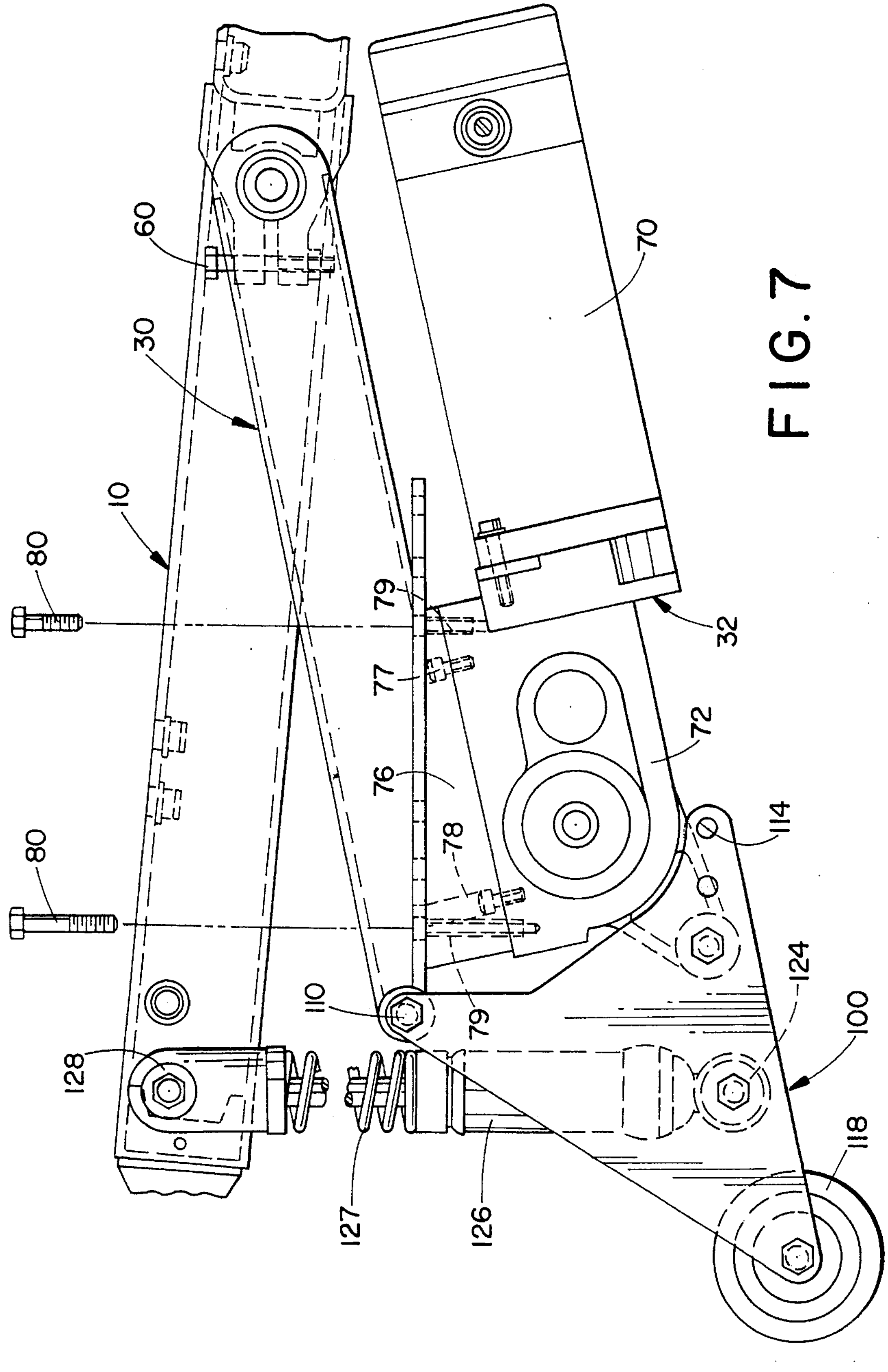
FIG. 7 is an enlarged side elevational assembled view of the wheelchair of FIG. 1 showing a portion of the main frame and the power drive assembly secured thereto; and, FIG. 8 is a perspective view of a wheelchair according to the present invention.

The first power drive assembly also includes, as mentioned, a first motor and gearbox assembly 32. This comprises a conventional motor 70 and a conventional gearbox 72 secured to one end of the motor. Extending normal to the gearbox is a drive shaft 74. A wedge 76 is secured to the top face of the gearbox 72 by fasteners 77 extending through apertures 78 as best seen in FIG. 7. Extending through the wedge and into the top of the gearbox are four spaced apertures 79 which, as is evident from FIG. 1, are located approximately at the corners of the wedge. These apertures 79 can be aligned with one of the three sets of apertures 68 provided on the swing arm second end plate 66. If so aligned, four screws 80 can be secured, one in a respective one of the four sets of colinear apertures. As is evident from FIG. 1, three adjacent apertures 68 are provided in each set of apertures in the plate-like second end 66 of the first swing arm 30. These apertures are spaced apart from each other by approximately one inch (2.54 cm.). In this way, the first motor and gearbox assembly 32 can be moved longitudinally in relationship to the first swing arm 30 by approximately two inches (5.08 cm.). Obviously, different distances can be chosen between the apertures and a larger number of apertures can be used to provide other ranges of adjustability.

As discussed, the motor and gear box assemblies 32 and 36 are adjustably and removably mounted on the first and second swing arms 30 and 34. Thus, if one of the motors 70 malfunctions, it can be easily replaced without disassembling the entire wheelchair, or even an integral power module of such chair. In fact, only the defective motor and gear box assembly need be replaced in a simple and speedy operation. The use of separate motors to power each of the driven wheels 94 is also advantageous to allow short radius turns for the wheelchair.

With reference now to FIG. 3, the wheelchair includes a pair of front casters 90. Each of these is mounted in a caster fork 92 having a stem which extends up through a respective socket 16, 24 at the front end of the respective sides of the frame 10 and is mounted thereto via bearings to allow for a rotation of the caster forks, and hence the casters, as necessary. The wheelchair is also provided with a pair of powered or driven wheels 94, only one of which is illustrated for simplicity. The wheel 94 is secured to a wheel hub 96 which, in turn, is secured to the drive shaft 74 of the first motor and gearbox assembly 32.

It should be appreciated that the pair of wedges 76 positioned atop the gearboxes 72 enable a movement or shifting of the motor and gearbox assemblies 32 and 36 longitudinally forward and rearward in relation to the first and second swing arms 30, 32 while at the same time maintaining the chair at the same height. Thus, a seat module of the wheelchair, as shown in FIG. 8, does not increase or decrease its distance from a subjacent support surface. More importantly, the bearings of the caster forks 92 remain in a vertical position for a free and proper rotation of the caster forks and the casters mounted thereon.

Provided rearwardly of the drive wheels 94 are a pair of anti-tip assemblies 100. Since these are identical, only one of them will be described, it being appreciated that the two have the same construction. The anti-tip assembly 100 includes first and second shock mount plates 102 and 104 which are substantially triangular in shape. Each of these includes a first aperture 106, located at an apex thereof, which can be aligned with a socket 108 provided on a rear end of the plate-like second end 62 of the first swing arm 30. When so aligned, a fastener 110, such as a screw, can extend therethrough to secure the plates 102, 104 to the first swing arm 30. A tip of the screw 110 is fastened in a nut 112 in order to hold the two plates 102, 104 on either side of the first swing arm 30.

Each plate is also provided with a number of second apertures 114 located on a lower right hand corner of the plate. These apertures have the same spacing as the apertures 68 in the plate-like second end 66. Thus, three such apertures are provided and these are spaced longitudinally apart by approximately one inch (2.54 cm.). Any of the sets of such apertures can be aligned with a socket 115 extending from a rear face of the gearbox 72. When so aligned, a fastener 110 can extend therethrough and a nut 112 serves to secure these elements together. Each plate also includes a third aperture 116 on a lower left hand corner thereof. Supported between the two plates 102 and 104 and aligned with the third aperture 116, is an anti-tip wheel 118. A fastener 110 extends through the anti-tip wheel as well as a pair of spacers 120 located on either side of the anti-tip wheel in order to secure the wheel between the pair of plates.

Each of the pair of plates also includes a fourth aperture 122. These apertures 122 can be aligned with a socket 124 located adjacent a bottom end of a shock absorber 126. One of the fasteners 110 can, in this manner, secure the shock absorber bottom end between the two plates. The shock absorber 126 is provided with a tension spring 127 for urging a piston rod of the shock absorber out of its casing. The shock absorber 126 also includes a socket 128 located adjacent its top end. The socket can be aligned with an aperture 132 adjacent the rear end 18 and 26 of a respective one of the frame first and second sides 12 and 20. There is also provided an aperture 134 in a side rail 136 of the battery support frame 63. The battery support frame is secured to the wheelchair frame 10, when its aperture 134 is aligned with the socket top end 128 and the frame aperture 132, by a suitable fastener 138.

While the shock absorber 126 is illustrated as being provided with a tension spring 127, it should be appreciated that the resilient biasing means illustrated can be replaced with a simple high spring rate type of spring (not illustrated). For example, rather than employing a 75 lb. per inch (517.1 kPa) spring 127 with the damping provided by the shock absorber, a 175 lb. per inch (1206.6 kPa) spring can be provided instead and no shock absorber employed.

In order to isolate the motor and gearbox assembly 32 from the H-frame 10, as mentioned, the system includes the pair of silent block rubber bushings 44 illustrated in FIG. 2. In addition, resilient material grommets and bushings (which can be made of rubber) are provided at the shock absorber top mounting socket 128 and bottom mounting socket 124 as is known in the art.

Movement of the first and second motor and gearbox assemblies 32 and 36 in relation to the first and second swing arms 30 and 34 also necessitates a change in the aperture 114 which is aligned with the socket 115 at the rear of the motor and gearbox assembly 72 in order to align these elements together. In other words; if the forwardmost aperture 68 is employed as illustrated in FIG. 3 of the drawings, then the forwardmost aperture 114 needs to be employed on the pair of shock mount plates 102, 104. On the other hand, if the rearwardmost aperture 68 is employed, then the rearwardmost aperture 114 on the two plates needs to be aligned with the socket 115.

Figure 4:
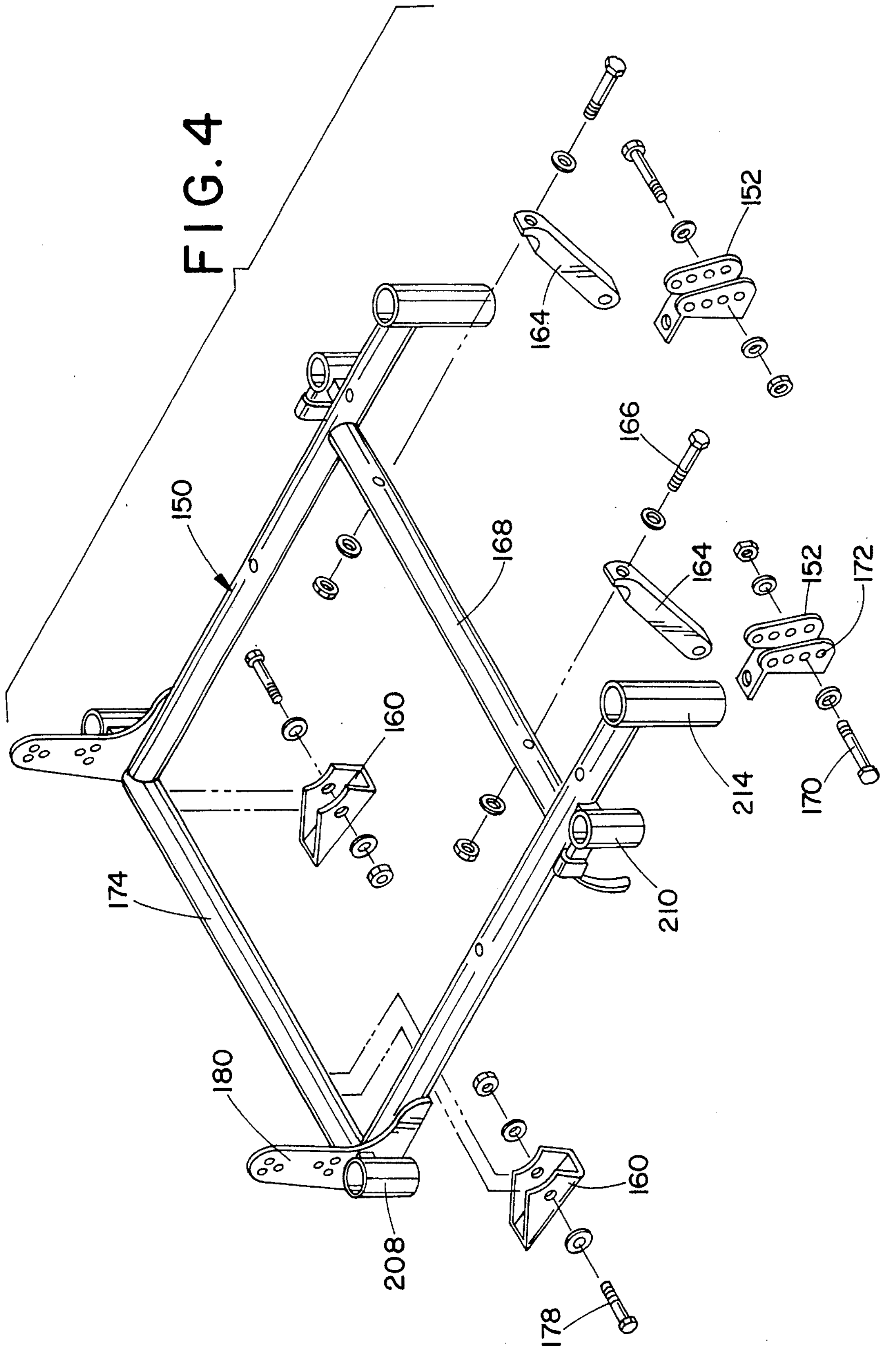
FIG. 4 is an exploded perspective view of a seat frame secured to the wheelchair of FIG. 1.

With reference now to FIG. 4, a seat frame 150 can be secured to the wheelchair frame 10. To this end, there is provided a pair of front seat bottom brackets 152 which are secured by suitable fasteners 154 (see FIG. 6A) via aligned apertures located on the top and front surfaces of the bridge and a substantially horizontally oriented tab portion and a vertically oriented central portion of each front seat bracket (only the top fastener 154 is illustrated for the sake of simplicity). Also provided are a pair of rear seat support brackets 160 which are secured via fasteners 161 (see FIG. 6A) extending through an aligned aperture 162 on the base of each rear bracket (see FIG. 6B) such that the fasteners extend into either of a pair of apertures 163 (see FIG. 1) located on the top surface of each of the sides 12 and 20. Two such apertures 163 are provided so that the seat frame, depending on the length of its side rails, can be fastened in either of the apertures. The seat frame 150 can be made in a variety of depths such that its side rails have different lengths. To this end, the seat frame can be made 14, 16, 18 or 20 inches deep (35.6, 40.6, 45.7 and 50.8 cm.) depending on the height of the occupant of the chair. When the seat module of the wheelchair is secured by the pair of rear support brackets 160 to the rear set of apertures 162, the front casters 90 of the wheelchair are unloaded to a great extent making maneuverability and turning extremely easy.

In order to secure the seat frame 150 to the front seat bottom brackets, there are provided a pair of front links 164 which are secured by suitable fasteners 166 to a front rail 168 of the seat frame, as shown in FIG. 6A. The base portions of the front links can be secured at a desired height by fasteners 170 which extend through one of the pairs of aligned apertures 172 in the front brackets 152. As is evident, four such pairs of apertures are provided. This enables a tilting of the seat portion of the seat module from 80 degrees to 100 degrees in relation to a vertical plane, as desired. As shown in FIG. 6B, rear rail 174 of the seat frame 150 is mounted on the support bracket 160. In order to secure the rear end of the seat frame 150 to the support bracket 160, the seat frame includes adjacent each rear corner a seat clamp bracket 176 welded to the rear rail 174. This is secured via suitable fasteners 178 to the rear support bracket 160.

Figure 5A:
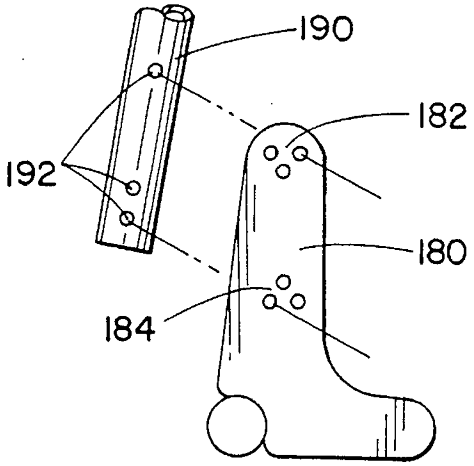
FIGS. 5A–5E are schematic views illustrating a back angle adjustment of the seatback of the wheelchair of FIG. 4.
Figure 5B:
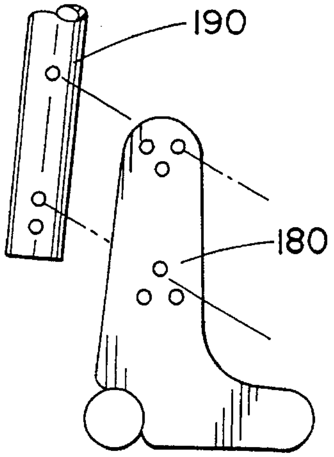
Figure 5C:
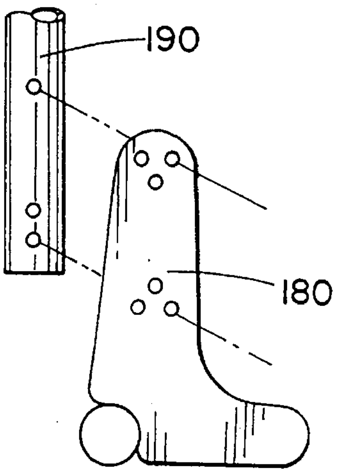
Figure 5D:
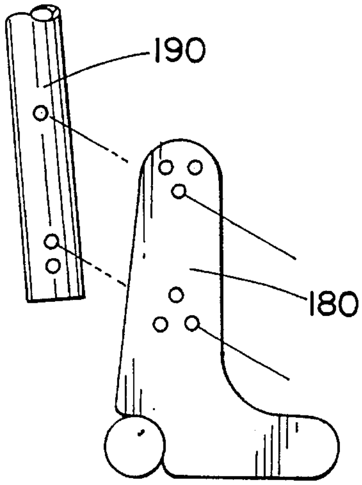
Figure 5E:
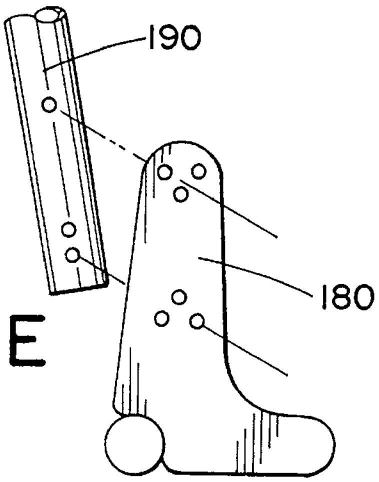

With reference now also to FIG. 5A, provided adjacent the cylindrical section 174, is a substantially L-shaped angle plate 180 having two spaced sets of apertures 182 and 184 in its upturned leg. Each of these include three apertures which are triangularly arranged. A back cane 190 of the seat module can be secured in varying orientations from 80 degrees to 100 degrees to a horizontal plane by employing different ones of the apertures 192 in the back cane 190 and sets of apertures 182 and 184 in the L-shaped angle plate 180 through which fasteners, (not shown) can extend, as is illustrated in FIGS. 5A–5E. In this way, the seat assembly can be configured to meet the needs of the user of the wheelchair.

With reference now to FIG. 8, there is illustrated a wheelchair according to the present invention. The wheelchair includes the main frame 10 as well as the first and second power drive assemblies. In that connection, visible is the first motor and gear box assembly 32 and the second motor and gear box assembly 36. Mounted on the seat frame 150 is a seat 200 and a seatback 202. Also mounted on the seat frame are first and second arm rests 204 and 206. In this connection, each of these arm rests is seated in a front socket 208 and a rear socket 210 (see FIG. 4) provided along each of the side edges of the seat frame 150. The seat frame is further provided with a pair of leg rest sockets 214 into which leg rests (not illustrated) can be secured as desired. A control panel 220 is mounted on the seat frame so as to enable the occupant of the wheelchair to direct the movement thereof. The control panel can include a joystick-type control, as well as one or more switches to direct the operation of the chair. In order to power the motors of the wheelchair, there is provided at least one battery 222. This is mounted on the battery subframe 63 (see FIG. 3) which is secured to the main frame 10.

The powered chair of the present invention, as shown in FIG. 8, can be provided in two weight classes. A standard weight class wheelchair employing a larger diameter, thinner tire 94, can be used for occupants up to 250 lbs. (113.5 Kg.) A heavier duty wheelchair usable by occupants up to 400 lbs. (181.4 Kg.) can be provided with a smaller diameter, thicker or wider, tire 94. The smaller tire gives an increased effective gear ratio so that the same motor has a greater pulling capacity as needed for the heavier load.

It should be noted that the motors 70 are angled upwardly, i.e. away from the subjacent support surface, in order to provide for good curb clearance for the wheelchair.

The adjustability of the first and second motor and gear box assemblies 32 and 36 on the first and second swing arms 30 and 34, respectively, enables a change in the moment of inertia of the wheelchair about a vertical axis. This facilitates the ability of the occupant of the wheelchair to turn the wheelchair. Such a configuration is especially beneficial in facilitating short radius turns. In addition, this configuration enables a more controlled turn acceleration, thereby facilitating user maneuverability in confined areas.

The invention has been described with reference to a preferred embodiment. Obviously, modifications and alterations will occur to others upon the reading and understanding of this specification. It is intended to include all such modifications and alterations insofar as they come within the scope of the appended claims or the equivalents thereof.

What is claimed is:

1. A powered wheelchair comprising:

a frame having first and second longitudinal sides connected by a bridge;

a seat module carried by said frame;

a first power drive assembly disposed on said frame first longitudinal side, said first power drive assembly comprising:

a first swing arm pivotally secured to said frame, a first motor mounted to said first swing arm, and a first wheel operably connected to said first motor, a second power drive assembly disposed on said frame second longitudinal side, said second power drive assembly comprising:

a second swing arm pivotally secured to said frame, a second motor mounted to said second swing arm, and a second wheel operably connected to said second motor;

a first anti tip assembly comprising a first section pivotally secured to said first swing arm and a second section secured, via one of at least two spaced apertures, to said first power drive assembly;

a second anti tip assembly comprising a first section pivotally secured to said second swing arm and a second section secured, via one of at least two spaced apertures, to said second power drive assembly; and, a power supply mounted on said frame for powering said first and second motors.

2. The wheelchair of claim 1 further comprising fasteners for securing said first motor to a second end of said first swing arm and said second motor to a second end of said second swing arm, respectively.

3. The wheelchair of claim 2 further comprising a plurality of apertures in each of said first and second swing arm second ends, said apertures being longitudinally spaced from each other to allow for a plurality of positions at which said first and second motors can be secured to said first and second swing arm second ends in order to adjust a center of gravity of the wheelchair.

4. The wheelchair of claim 1 wherein said seat module comprises a seat frame secured to said frame of the wheelchair, a seat section, which is substantially horizontally oriented, secured to said seat frame and a seatback section, which is substantially vertically oriented, secured to said seat frame.

5. The wheelchair of claim 4 further comprising a first means for adjusting said seat section in relation to a horizontal plane, said means for adjusting extending between said seat frame and said frame of the wheelchair and being secured to both.

6. The wheelchair of claim 4 further comprising a second means for adjusting said seatback section in relation to a vertical plane, said means for adjusting comprising cooperating portions of said seatback and said seat frame.

7. The wheelchair of claim 1 wherein said first power drive assembly further comprises:

a gearbox secured to said motor; and, a wedge shaped insert secured to said gearbox, said first swing arm being secured to said gearbox over said wedge shaped insert.

8. The wheelchair of claim 1 further comprising a shock absorber secured between said frame and said first anti-tip assembly.

9. The wheelchair of claim 8 wherein a first end of said shock absorber is secured to said frame first longitudinal side and a second end of said shock absorber is secured to a shock mount plate of said first anti-tip assembly and wherein said shock mount plate is secured to at least one of said first swing arm and said first power drive assembly.

10. A wheelchair having an adjustable seat module, the wheelchair comprising:

a main frame having first and second longitudinal sides connected by a bridge;

a seat module carried by said main frame wherein said seat module comprises a seat frame secured to said main frame, a seat section, which is substantially horizontally oriented, secured to said seat frame and a seatback section, which is substantially vertically oriented, secured to said seat frame;

a first means for adjusting said seat section in relation to a horizontal plane, said first means for adjusting extending between said seat frame and said main frame and being secured to both;

a second means for adjusting said seatback section in relation to a vertical plane, said second means for adjusting comprising an angle plate secured to said seat frame, said angle plate including two spaced sets of three triangularly spaced apertures, and a cane of said seatback section, said seatback cane including a pair of spaced apertures, and two fasteners for securing said seatback cane to said angle plate, one extending through each of said pair of spaced apertures in said seatback cane and into selected ones of said plurality of apertures in said angle plate such that each respective one of said pair of spaced apertures of said seatback cane can be aligned with each respective aperture of one of said two sets of three triangularly spaced apertures in said angle plate.

11. The wheelchair of claim 10 wherein said first means for adjusting comprises:

a seat bottom bracket secured to said main frame, said seat bottom bracket including a plurality of spaced apertures;

a link secured to said seat frame, said link including an aperture; and, a fastener for securing said link via said aperture therein to a respective one of said apertures in said seat bottom bracket.

12. The wheelchair of claim 11 wherein a pair of spaced seat bottom brackets are secured to said main frame and a pair of spaced links are secured to said seat frame.

13. A motorized wheelchair having an independent suspension and an adjustable center of gravity, the wheelchair comprising:

an H-shaped frame having first and second longitudinal sides connected by a bridge;

a seat module carried by said frame;

a first power drive assembly disposed on said frame first longitudinal side, said first power drive assembly comprising:

a first swing arm pivotally secured at a first end to said frame, a first motor and gear box assembly mounted to a second end of said first swing arm, wherein a plurality of longitudinally spaced apertures are located in said first swing arm second end to allow for a plurality of positions at which said first motor and gearbox assembly can be mounted to said first swing arm second end in order to adjust a center of gravity of the wheelchair, and a first wheel operably connected to said first motor and gear box assembly;

a second power drive assembly disposed on said frame second longitudinal side, said second power drive assembly comprising:

a second swing arm pivotally secured at a first end to said frame, a second motor and gear box assembly mounted to a second end of said second swing arm wherein a plurality of longitudinally spaced apertures are located in said second swing arm second end to allow for a plurality of positions at which said second motor and gearbox assembly can be mounted to said second swing arm second end in order to adjust a center of gravity of the wheelchair, and, a second wheel operably connected to said second motor and gear box assembly; and, a power supply mounted on said frame for powering said first and second motors wherein said first and second power drive assemblies each further comprise a means for mounting said first and second motor and gearbox assemblies to enable an adjustment of the center of gravity of the wheelchair while maintaining the chair at the same height.

14. The wheelchair of claim 13 wherein said seat module comprises a seat frame secured to said H-shaped frame, a seat section, which is substantially horizontally oriented, secured to said seat frame and a seatback section, which is substantially vertically oriented, secured to said seat frame and a first means for adjusting said seat section in relation to a horizontal plane and a second means for adjusting said seatback section in relation to a vertical plane.

15. The wheelchair of claim 13 wherein said wheelchair frame bridge comprises a pair of spaced supports to which said first end of a respective one of said first and second swing arms are secured.

16. The wheelchair of claim 13 wherein said first and second motors comprise electric motors and said power supply comprises at least one battery.

17. A motorized wheelchair having an adjustable center of gravity, the wheelchair comprising:

a frame having first and second longitudinal sides connected by a bridge a first and second swing arm pivotally mounted to the frame;

a seat module carried by said frame;

a first power drive assembly disposed on said frame first swing arm, said first power drive assembly comprising:

a first motor and gear box assembly, and a first means for mounting said first motor and gearbox assembly to said first swing arm, wherein said first means for mounting allows for at least two longitudinally spaced positions at which said first motor and gearbox assembly can be mounted to said frame in order to adjust a center of gravity of the wheelchair; and, a second power drive assembly disposed on said frame second longitudinal side, said second power drive assembly comprising:

a second motor and gear box assembly which is disposed in spaced relation to said first motor and gearbox assembly, and a second means for mounting said second motor and gearbox assembly to said second swing arm, wherein said second means for mounting allows for at least two longitudinally spaced positions at which said second motor and gear box assembly can be mounted to said second swing arm in order to adjust a center of gravity of the wheelchair wherein said first and second means for mounting enable an adjustment of the center of gravity of the wheelchair while maintaining the chair at the same height.

18. The wheelchair of claim 17 further comprising a first anti tip assembly comprising a first section pivotally secured to said frame first longitudinal side and a second section secured, via one of at least two spaced apertures, to said first motor and gearbox assembly.

19. The wheelchair of claim 18 further comprising a second anti tip assembly comprising a first section pivotally secured to said frame second longitudinal side and a second section secured, via one of at least two spaced apertures, to said second motor and gearbox assembly.

20. A powered wheelchair comprising:

a frame having first and second longitudinal sides connected by a bridge;

a seat module carried by said frame;

a first power drive assembly disposed on said frame, said first power drive assembly comprising:

a first swing arm extending along one of said first and second longitudinal sides pivotally secured to said frame, a first motor mounted to said first swing arm, and a first wheel operably connected to said first motor;

a first shock absorber comprising a first end secured to said frame long said one of said first and second sides and a second end operably secured to said first power drive assembly; and, a first means for mounting said first motor to said first swing arm wherein said first means for mounting allows for at least two longitudinally spaced positions at which said first motor can be mounted to said first swing arm in order to enable an adjustment of the center of gravity of the wheelchair while maintaining the chair at the same height.

21. The wheelchair of claim 20 further comprising:

a second power drive assembly disposed on said frame second longitudinal side, said second power drive assembly comprising:

a second swing arm pivotally secured to said frame, a second motor mounted to said second swing arm, and a second wheel operably connected to said second motor;

a second shock absorber comprising a first end pivotally secured to said frame second side and a second end operably secured to said second power drive assembly; and, a second means for mounting said second motor to said second swing arm to enable an adjustment of the center of gravity of the wheelchair while maintaining the chair at the same height.

22. The wheelchair of claim 21 further comprising a second means for mounting said second motor to said second swing arm, wherein said second means for mounting allows for at least two longitudinally spaced positions at which said second motor can be mounted to said second swing arm in order to adjust a center of gravity of the wheelchair.

* * * * *